(12) United States Patent
Auerbach et al.

(10) Patent No.: US 8,127,261 B2
(45) Date of Patent: Feb. 28, 2012

(54) SYSTEM FOR QUICKLY SPECIFYING FORMAL VERIFICATION ENVIRONMENTS

(75) Inventors: Gadiel Auerbach, Jerusalem (IL); Matan Gal, Haifa (IL); Ziv Nevo, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 12/356,116

(22) Filed: Jan. 20, 2009

(65) Prior Publication Data
US 2010/0185992 A1 Jul. 22, 2010

(51) Int. Cl.
*G06F 9/455* (2006.01)
*G06F 17/50* (2006.01)

(52) U.S. Cl. ........ 716/107; 716/100; 716/101; 716/102; 716/103; 716/104; 716/105; 716/106; 716/110; 716/111; 716/136; 716/139; 714/46

(58) Field of Classification Search .......... 716/100–107, 716/110–111, 136, 139; 714/46
See application file for complete search history.

(56) References Cited

U.S. PATENT DOCUMENTS

| | | | | |
|---|---|---|---|---|
| 7,055,118 | B1 * | 5/2006 | Kamepalli et al. | 716/107 |
| 7,080,365 | B2 * | 7/2006 | Broughton et al. | 717/146 |
| 7,165,231 | B2 * | 1/2007 | Buckley, Jr. | 716/102 |
| 7,900,168 | B2 * | 3/2011 | Chugh et al. | 716/104 |
| 7,900,188 | B2 * | 3/2011 | Costa et al. | 717/106 |
| 2009/0013301 | A1 * | 1/2009 | Ogilvie et al. | 716/18 |

* cited by examiner

*Primary Examiner* — Nghia Doan
(74) *Attorney, Agent, or Firm* — Daniel Kligler

(57) ABSTRACT

Computer-implemented techniques are disclosed for defining an environment for formal verification of a design-under-test. Initially there is extraction of design inputs by a design analysis module, and presentation of the inputs on a graphical user interface. Behavior options for the design inputs are offered on the graphical user interface for selection by an operator. Environment code that is descriptive of the design inputs and selected behavior options is emitted, typically in a hardware description language, for submission to a formal verification tool. A meta-code file containing the assigned behavior options is generated to aid subsequent sessions.

22 Claims, 8 Drawing Sheets

SYSTEM FOR QUICKLY SPECIFYING FORMAL VERIFICATION ENVIRONMENTS

BACKGROUND OF THE INVENTION

1. Field of the Invention

This invention relates to computer aided design verification. More particularly, this invention relates to graphical techniques for explicitly assigning behaviors to hardware design inputs.

2. Description of the Related Art

TABLE 1

| Acronyms and Abbreviations | |
|---|---|
| DFT | Design-For-Test |
| DUT | Design-Under-Test |
| FV | Formal Verification |
| HDL | Hardware Description Language |
| PSL | Property Specification Language |
| RAM | Random Access Memory |
| RTL | Register Transfer Level |
| VHDL | VHSIC Hardware Description Language |
| VHSIC | Very High Speed Integrated Circuits |
| XML | eXtensible Markup Language |

Formal verification (FV) has gained momentum in recent years and is now an important step in the process of validating a hardware design. For example, formal verification can pinpoint corner-case misbehaviors in a search space. However, due to the potential of formal verification to search a state space exhaustively, formal verification engineers must be careful to ensure that the verification of the design-under-test (DUT) deals only with legal inputs. In other words, design input behavior must reflect an agreed protocol between a design-under-test and its surrounding hardware modules. This agreed protocol is usually referred to as the environment of the design-under-test.

Design inputs can be assigned legal behavior in two ways: in one approach, a hardware description language (HDL), such as Verilog®, specifies either a combinational function or a next-state function for each design input. Formal verification tools usually require that only synthesizable constructs are to be used for that purpose. Most behavioral constructs are not allowed.

In a second approach a declarative language, such as Process Specification Language (PSL), described in ISO 18629 of the International Standards Organization, is used to specify temporal conditions on the behavior of a design input, e.g., "The input ack will always be asserted two cycles after the output req was asserted".

In either case, specifying the environment manually, even with the aid of one of the above-described alternatives, remains one of the most labor-intensive tasks in a formal verification project. Every design input must be assigned an appropriate and correct behavior. The assignment should not be too restrictive, lest design flaws may escape detection. Neither should it be too loose, in order to prevent the false detection of spurious design flaws. It is indeed a tedious and repetitive task.

BRIEF SUMMARY

An embodiment of the invention provides a method for defining an environment for formal verification, which is carried out by operating a computer system to present a graphical user interface on a display, and executing a design analysis program to extract a plurality of design inputs from a specification of a hardware design-under-test, reading into the computer system respective behavior options for the design inputs from a configuration file, displaying the design inputs and respective behavior options on the graphical user interface, and establishing a behavioral assignment by designating interactively with the graphical user interface at least a portion of the respective behavior options for application to the design inputs. The method is further carried out responsively to the behavioral assignment by generating environment code that is descriptive of the design inputs and designated respective behavior options thereof, and applying the environment code in a verification tool for verification of the design-under-test.

Other embodiments of the invention provide computer software product and apparatus for carrying out the above-described method.

An embodiment of the invention provides a method for constructing a solid-state circuit, which is carried out by operating a computer system to present a graphical user interface on a display, and executing a design analysis program to extract a plurality of design inputs from a specification of a solid state integrated circuit, reading into the computer system respective behavior options for the design inputs from a configuration file, displaying the design inputs and respective behavior options thereof on the graphical user interface, and establishing a behavioral assignment by designating interactively with the graphical user interface at least a portion of the respective behavior options for application to the design inputs. The method is further carried out responsively to the behavioral assignment by generating environment code that is descriptive of the design inputs and designated respective behavior options thereof, compiling the environment code into a netlist that describes connectivity of the integrated circuit, translating the netlist into a formatted code that is acceptable to a foundry, and submitting the formatted code to the foundry to produce an integrated circuit chip that is operative according to the behavioral assignment.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION

Figure 1:
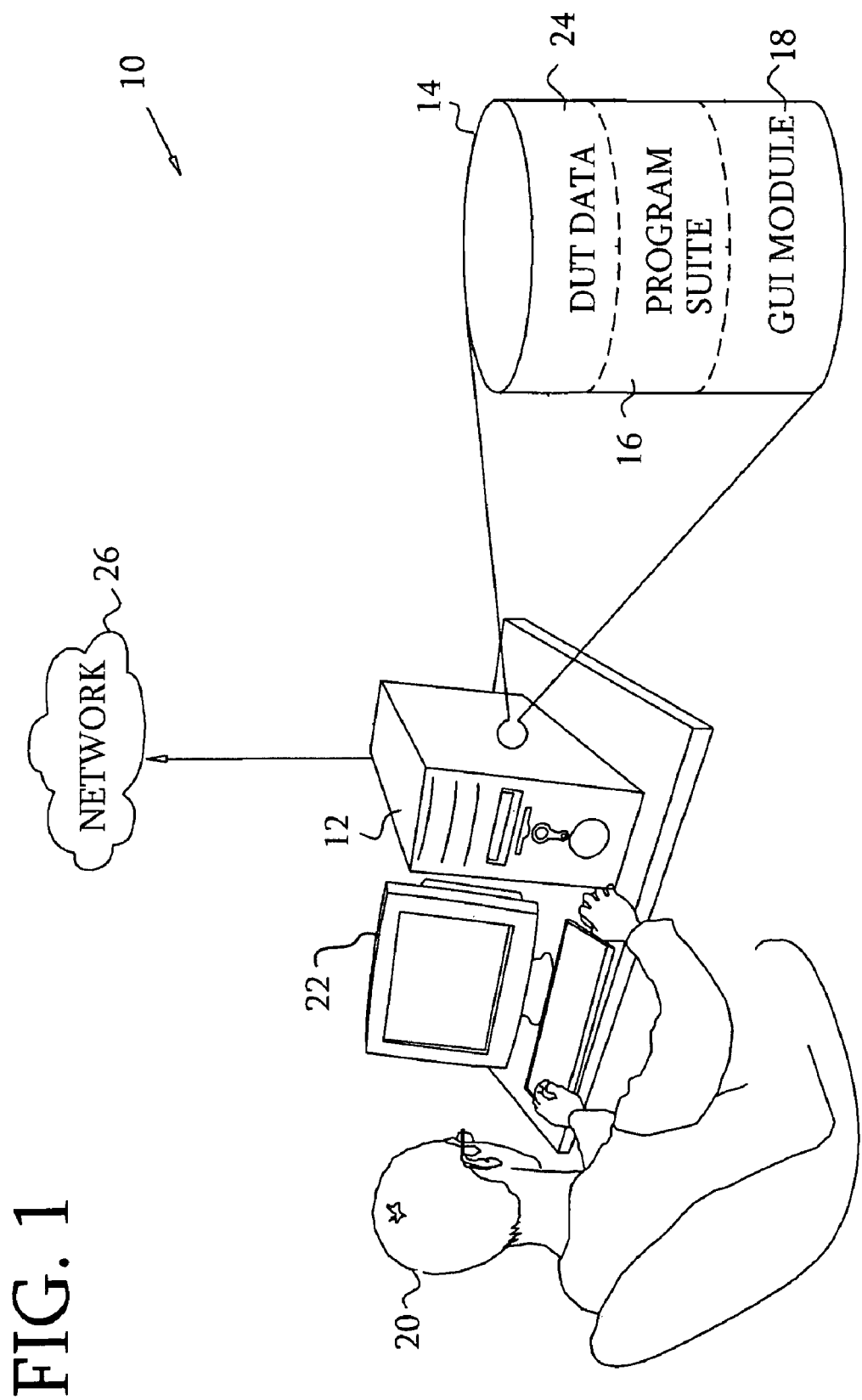
FIG. 1 is a high level diagram of a design verification system, which is constructed and operative in accordance with a disclosed embodiment of the invention.

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate tangible or intangible medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus provide processes for implementing the functions/acts specified in the flowchart and/or block diagram block or blocks.

Overview.

Turning now to the drawings, reference is initially made to FIG. 1, which is a high level diagram of a design verification system 10, which is constructed and operative in accordance with a disclosed embodiment of the invention. The teachings of the present invention are not restricted to systems that are configured like the system 10, but are applicable to many systems that have architectures differing from the system 10.

The system 10 is used for verifying an implementation of a design-under-test. In the present embodiment, the design-under-test is assumed to be a hardware design, for example a processor architecture, bus controller, or integrated circuit, but the design-under-verification may alternatively comprise software or combinations of hardware and software elements. Further alternatively, the design-under-test may be a model of a state-transition system, which performs discrete changes of its current state as time elapses. Examples include models of a controller of a traffic light, and a clearing house for financial transactions.

The system 10 has several basic interacting components. The system 10 is typically realized as a computer that includes a processor 12 and a memory 14 that is accessible to the processor 12 and contains programs and data objects corresponding to the functional identifiers depicted in FIG. 1.

Thus, although portions of the system 10 shown in FIG. 1 and other drawing figures herein are shown as comprising a number of separate functional blocks, these blocks are not necessarily separate physical entities, but rather may represent, for example, different computing tasks or data objects stored in a memory that is accessible to the processor. These tasks may be carried out in software running on a single processor, or on multiple processors.

The system 10 comprises a formal verification tool, shown as program suite 16. At the heart of the system 10 is a module for presenting a graphical user interface 18. An operator 20 may interact with the graphical user interface 18 using a display 22 to assign explicit behavior to hardware design inputs based on a library of common behaviors that is stored in the memory 14 and represented in FIG. 1 as design-under-test data 24. Using the graphical user interface 18 the operator 20 may interactively specify and alter the behavior of design inputs by selection from available "behavior options". The term behavior options refers to changes in time of an environmental element responsively to a design signal or responsively to value changes of other environment elements, whether observable or non-observable. In FIG. 1, the memory 14 is shown as a single unit. However, as is known in the art, the memory 14 may be distributed in many local and remote storage sites (not shown). Such storage sites may be accessed via a network 26.

The data 24 may include an abstract knowledge base that holds a formal description of the specification of the design-under-test. This specification may be stored in a database, which may also incorporate testing knowledge of the system design, and may include testing constraints and coverage criteria. It is possible to apply the principles of the invention in systems in which the knowledge base is omitted.

In many hardware design elements, the behavior of inputs can be selected from a limited set of possibilities. Assigning behaviors to inputs to more complex elements may require choices from a larger set of possibilities, and hence demand some deeper thought, but such cases are usually infrequent. While the principles of the invention could be applied to the other inputs, the benefit of the invention is especially pronounced when applied to unexceptional hardware elements, such as clocks, reset signals, counters, and configuration registers.

Figure 2:
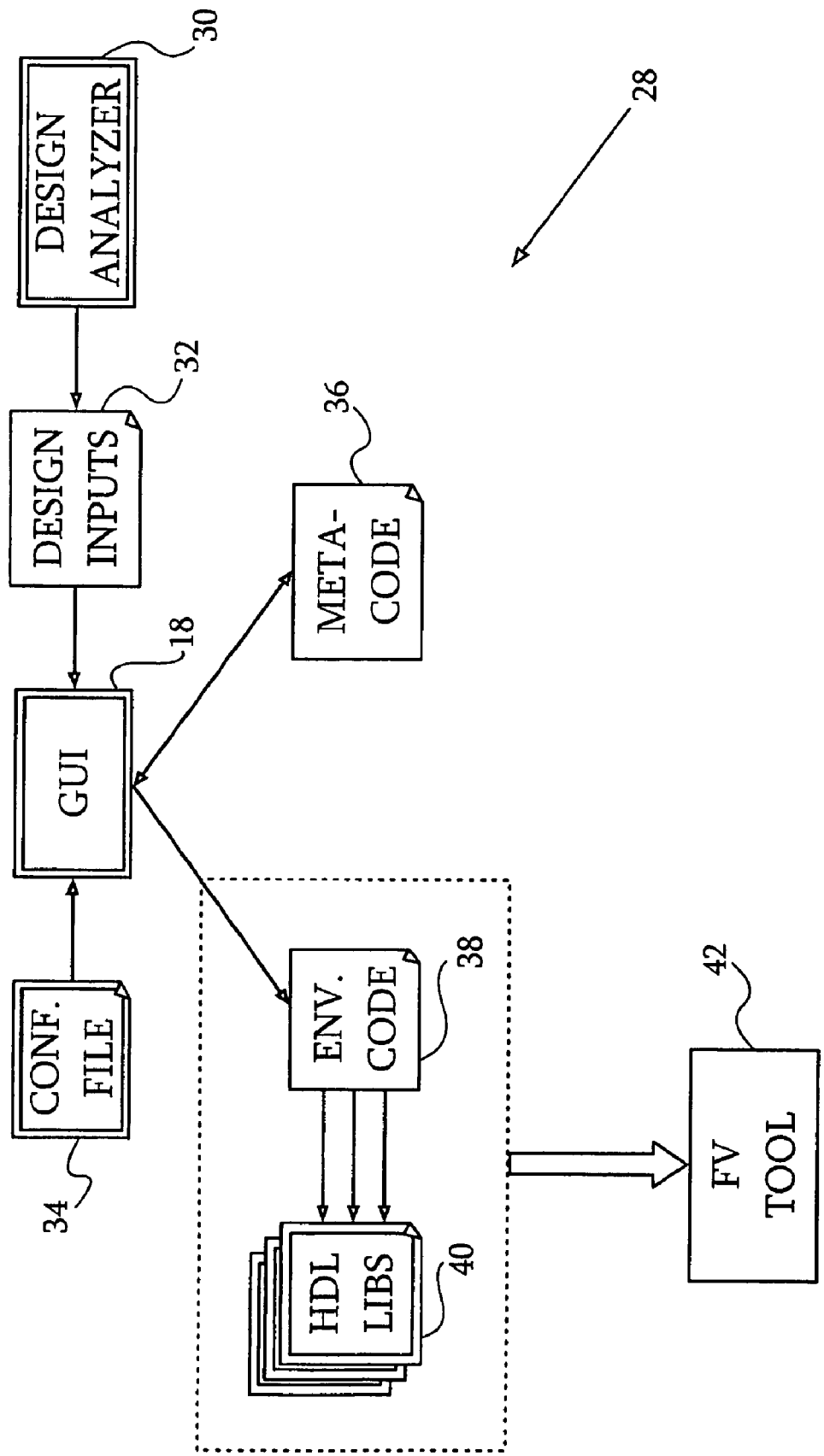
FIG. 2 is a detailed block diagram of an arrangement of programs and objects that are stored in a memory of the system shown in FIG. 1, in accordance with a disclosed embodiment of the invention.

Reference is now made to FIG. 2, which is a detailed block diagram of an arrangement of programs and objects stored in the memory 14 (FIG. 1), in accordance with a disclosed embodiment of the invention. The functional and data objects shown in FIG. 2 collectively form an operative entity referred to for convenience as an environment wizard 28. A design analyzer 30 accesses the specification of the design-under-test that is stored in memory 14 (FIG. 1), and extracts a series of design inputs 32 from the specification for hardware elements in the design-under-test. Typically, the design analyzer 30 scans hardware design language (HDL) source code or compiled code, identifies the design inputs, and writes them into a file. The design analyzer 30 typically operates at the logic level or gate level of an electronic system, and may use any of a variety of techniques, e.g., digital logic analysis, in-circuit emulation, design-for-test (DFT) techniques, and hardware emulation. Many design analyzers are known in the art and are suitable for use as the design analyzer 30 The design analysis module integrated in RuleBase™ Parallel Edition, available from International Business Machines Corporation, Armonk, N.Y. 10504 is used in one current embodiment as the design analyzer 30. Alternatively, the front end of a HDL compiler may serve as the design analyzer 30. The design inputs 32 are operator-selectable using the graphical user interface 18.

There are three inputs to the graphical user interface 18, which may be received as files. The design inputs 32 constitute a first input.

A second input is a configuration file 34 having a structured format such as eXtensible Markup Language (XML), which lists respective behavior options for the design inputs 32 that are available for selection by the user. For each behavior, the configuration file also lists its parameters together with convenient default values. The system 10 (FIG. 1) is applicable to any formal verification platform and supports any hardware description language used to describe the design-under-test. Thus, it is possible to have different configuration files for different target hardware description languages.

Typically a verification project is an iterative process. A meta-code file 36, reflecting the choices made by the user in the last session, forms a third input to the graphical user interface 18. More specifically, the meta-code file 36 lists previously assigned behavior for design inputs—the selected behavior options and previously chosen parameters. In a new formal verification project, the first session of the environment wizard 28 usually starts without the meta-code file 36, as the design inputs normally as yet have no assigned behavior. The meta-code file 36 may be an XML file.

The output of the graphical user interface 18 is an environment code file 38, usually expressed in a hardware description language. For example, the environment code file 38 may be written in PSL (Property Specification Language). The environment code may invoke one or more hardware description language libraries 40. The libraries 40 are an essential building block in both hardware design and hardware verification, offering a wide collection of constructs ranging from basic hardware elements, for example in VHDL (Virtual Hardware Description Language) standard packages to complex communication drivers and to high level verification constructs. In any case, the list of selectable behaviors in the configuration file 34 should match the content of the libraries 40.

The environment code file 38 is acceptable for submission to a generic formal verification tool 42. The current embodiment has been implemented using the above noted Rulebase product as the formal verification tool 42. This is a formal verification tool adapted to large hardware designs. Many other known formal verification tools are suitable for use with the environment code file 38 or can be readily modified by those skilled in the art to accept the environment code file 38.

Figure 3:
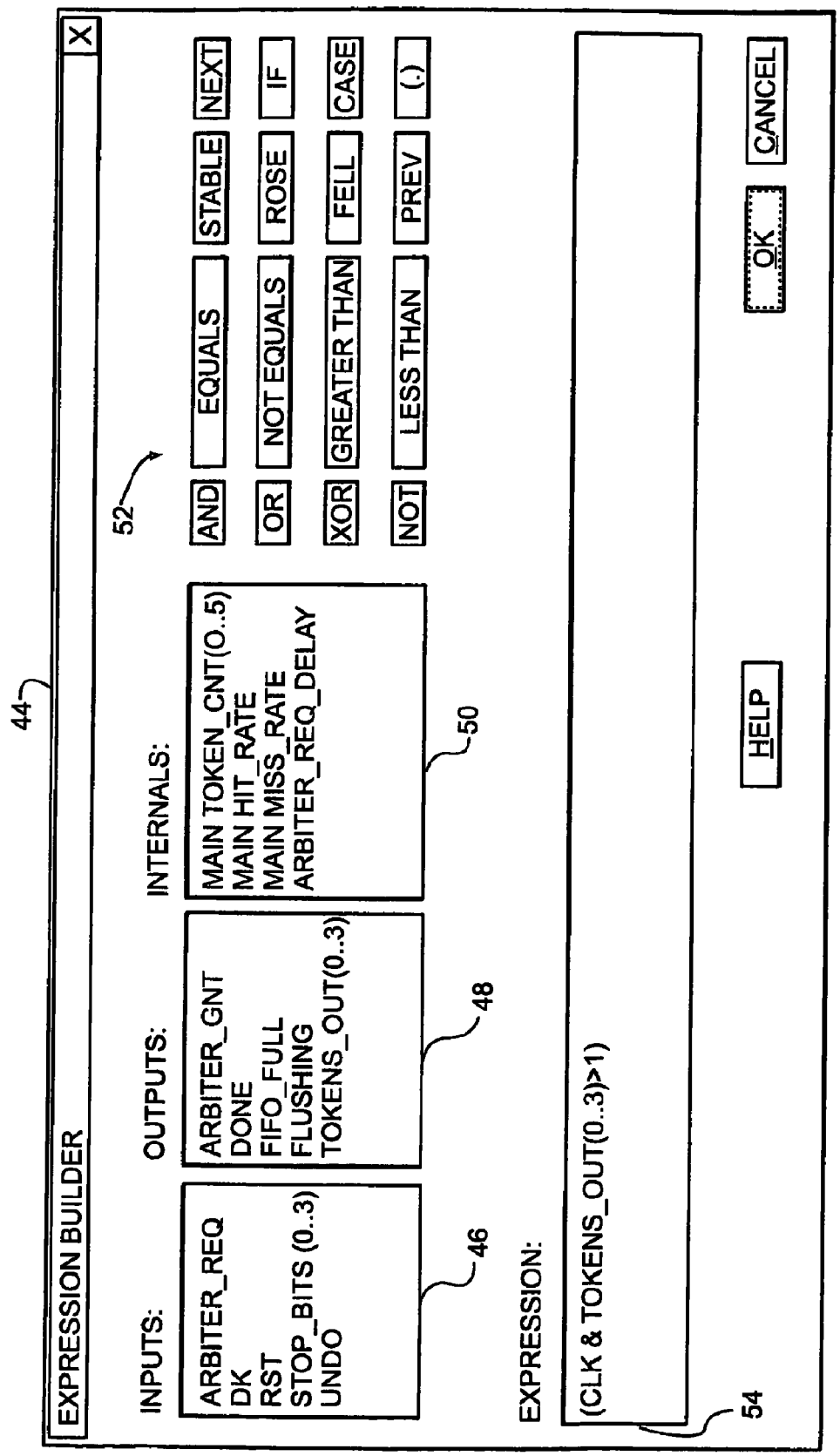
FIG. 3 is a screen display showing a dialog box that is generated by the graphical user interface in FIG. 2, in accordance with a disclosed embodiment of the invention.

Reference is now made to FIG. 3, which is a screen display of a dialog box, referred to herein as expression builder 44, which is generated by the graphical user interface 18 (FIG. 2), in accordance with a disclosed embodiment of the invention. Configuration of the behavior of a design input is facilitated by use of the expression builder 44, which displays possibilities for constructing a hardware description language expression of the behavior, including a list of design inputs 46, a list of outputs 48, a series of internal parameters 50, and a set of operators 52 in the right upper portion of the screen display. Selection of the possibilities by the operator generates an expression 54, as shown in the lower portion of the screen display.

The graphical user interface 18 may be constructed using classes extracted form the QT® open source libraries, available on the web site of Trolltech®. The following QT classes were used to program the graphical user interface 18:

Class QMainWindow creates the main application window and provides the basis for its functions.

Classes QItemSelectionModel and QItemStandardModel are used for list processing and manipulation, for example a list of signals that have an assigned behavior and signals that do not have any behavior attached.

Classes QComboBox and QSpinBox help to choose the parameters of the assigned behavior, for example the reset signal and the maximal value of a counter.

Class QDomElement reads and writes XML files.

Class QItemDelegate handles events happening in a time interval, for example, a user of the application may "click" on a signal name in order to choose a behavior.

Operation.

Figure 4:
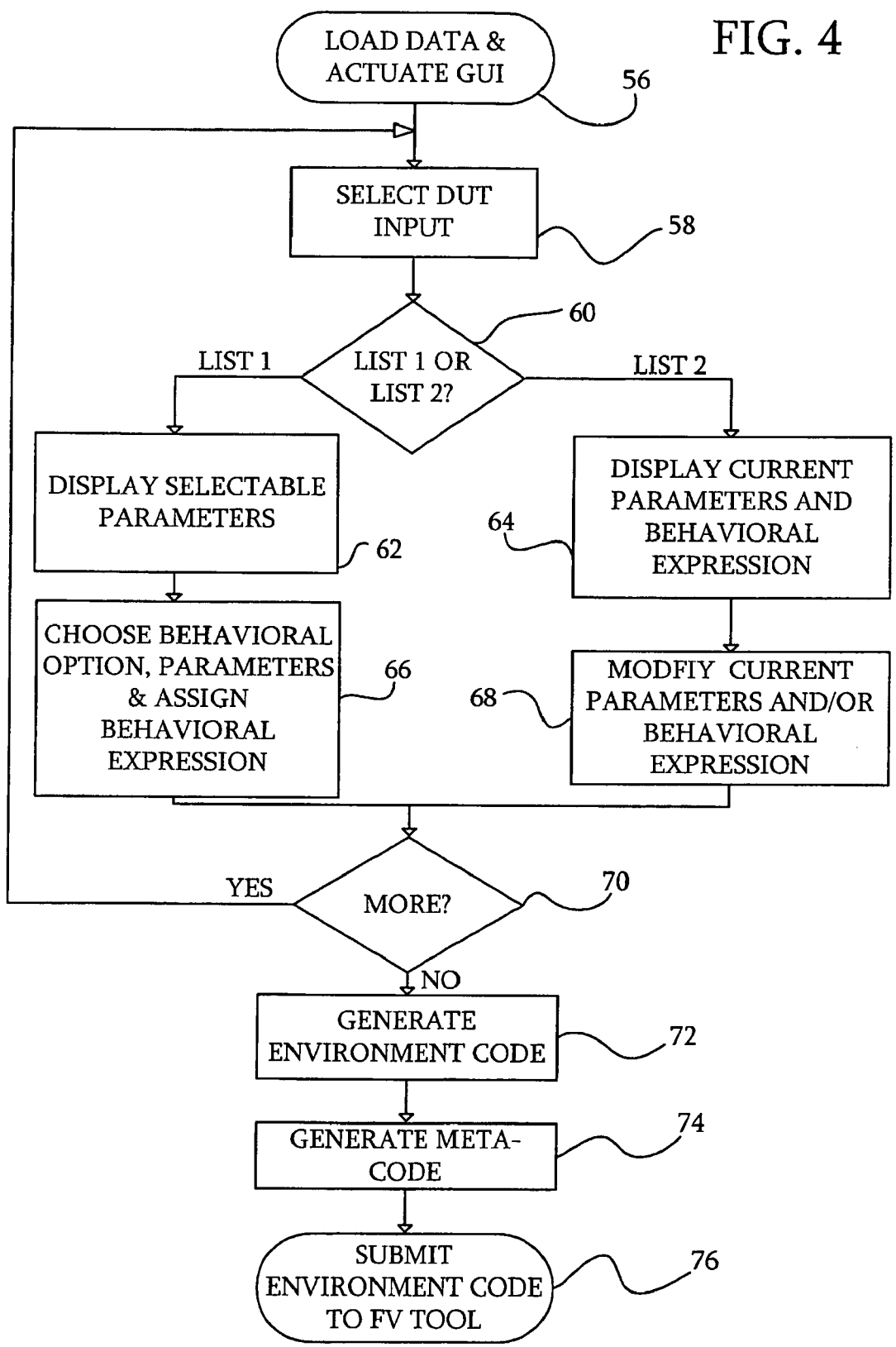
FIG. 4 is a flow chart of a method of specifying formal verification environments, in accordance with a disclosed embodiment of the invention.

Reference is now made to FIG. 4, which is a flow chart of a method of specifying formal verification environments in accordance with a disclosed embodiment of the invention. The method may be carried out using the environment wizard 28 (FIG. 2). The process steps are shown in a particular linear sequence in FIG. 4 for clarity of presentation. However, it will be evident that many of them may be performed in different orders.

At initial step 56 specification data of a design-under-test is loaded into a memory and the environment wizard 28 (FIG. 2) is activated. Graphical user interface 18 provides for two disjoint lists of design inputs pertaining to the design-under-test: A first list, referred to as "List 1" has design inputs having no assigned behavior. A second list, "List 2" presents design inputs having assigned behavior.

Next, at step 58, the current state of the two lists is shown on the graphical user interface. A design input is selected from List 1 or List 2.

Control now proceeds to decision step 60, where it is determined if the currently selected input originated from inputs having no assigned behavior (List 1) or from inputs having assigned behavior (List 2). If the former then control proceeds to step 62. If the latter, then control proceeds to step 64.

At step 62, the graphical user interface displays a selection of parameters and other behavioral options for the currently selected input. Default parameters may be suggested.

Next, at step 66 a behavioral option is chosen for the currently selected input are chosen, and parameters are set for the chosen behavioral option. The operator may invoke the expression builder 44 (FIG. 3) at this point.

Once accepted by the operator, the graphical user interface moves the current input to the list of inputs having assigned behavior.

Step 64 is performed if the behavior of the currently selected input has previously been assigned. The graphical user interface shows the currently selected configuration of the currently selected input. This configuration may have been determined in the current session, or may be available from a previous session using the meta-code file 36 (FIG. 2).

Next, at step 68 the operator may modify the configuration of the currently selected input, optionally using the expression builder 44 (FIG. 3).

After completion of step 66 or step 68, control now proceeds to decision step 70, where it is determined if more inputs require assignment of behavior, or changes to existing behavior assignments. If the determination at decision step 70 is affirmative, then control returns to step 58 for another iteration.

If the determination at decision step 70 is negative, then control proceeds to step 72, where an environment code file in a selected hardware description language is generated, using the foregoing design input behavior assignments. The code consists mainly of instantiations of modules in the hardware description language libraries, e.g., libraries 40 (FIG. 2), each module implementing a different common behavior.

Next, at step 74 a meta-code file is generated, saving the behavior assignments developed in the current session for use in a subsequent session.

Then, at final step 76 the environment code file produced in step 72 is submitted to a formal verification tool, which can then operate using the environment code to verify or detect flaws in the design-under-test.

Example

Figure 5:
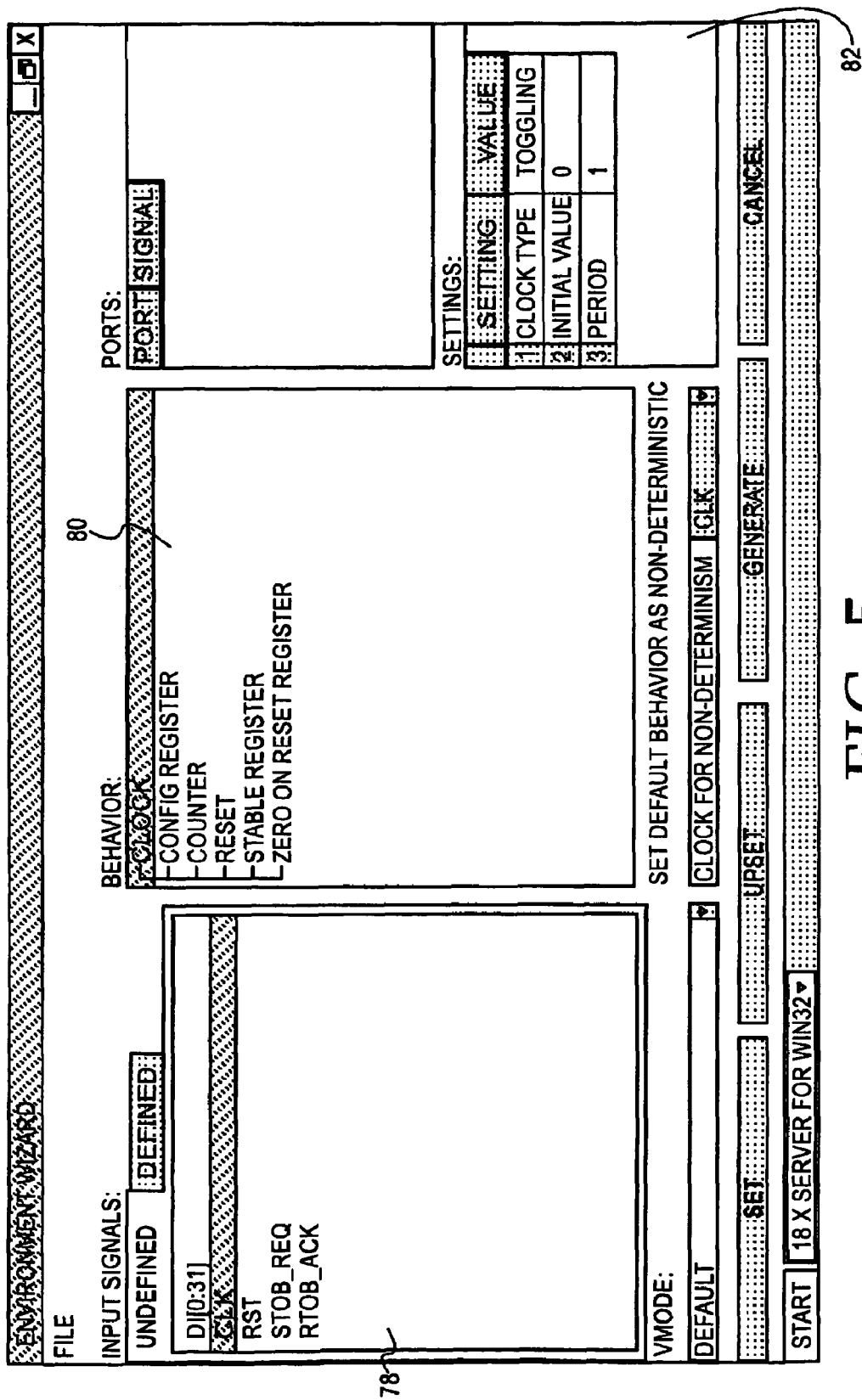
FIG. 5 is an exemplary screen display that is generated by the graphical user interface of FIG. 2, in accordance with a disclosed embodiment of the invention.

Reference is now made to FIG. 5, which is a screen display that is generated by environment wizard 28 (FIG. 2) via the graphical user interface 18, in accordance with a disclosed embodiment of the invention. A list of input signals appears in left pane 78. Assigned behaviors are displayed in central pane 80. Parameters for an assigned behavior appear in a lower right pane 82. In FIG. 5, a selected design signal "CLK" is assigned with a behavior called "Clock", where the parameters are: (1) "clock type" having a value "toggling"; (2) "initial value" set to "0"; and (3) "period" set to "1".

Figure 6:
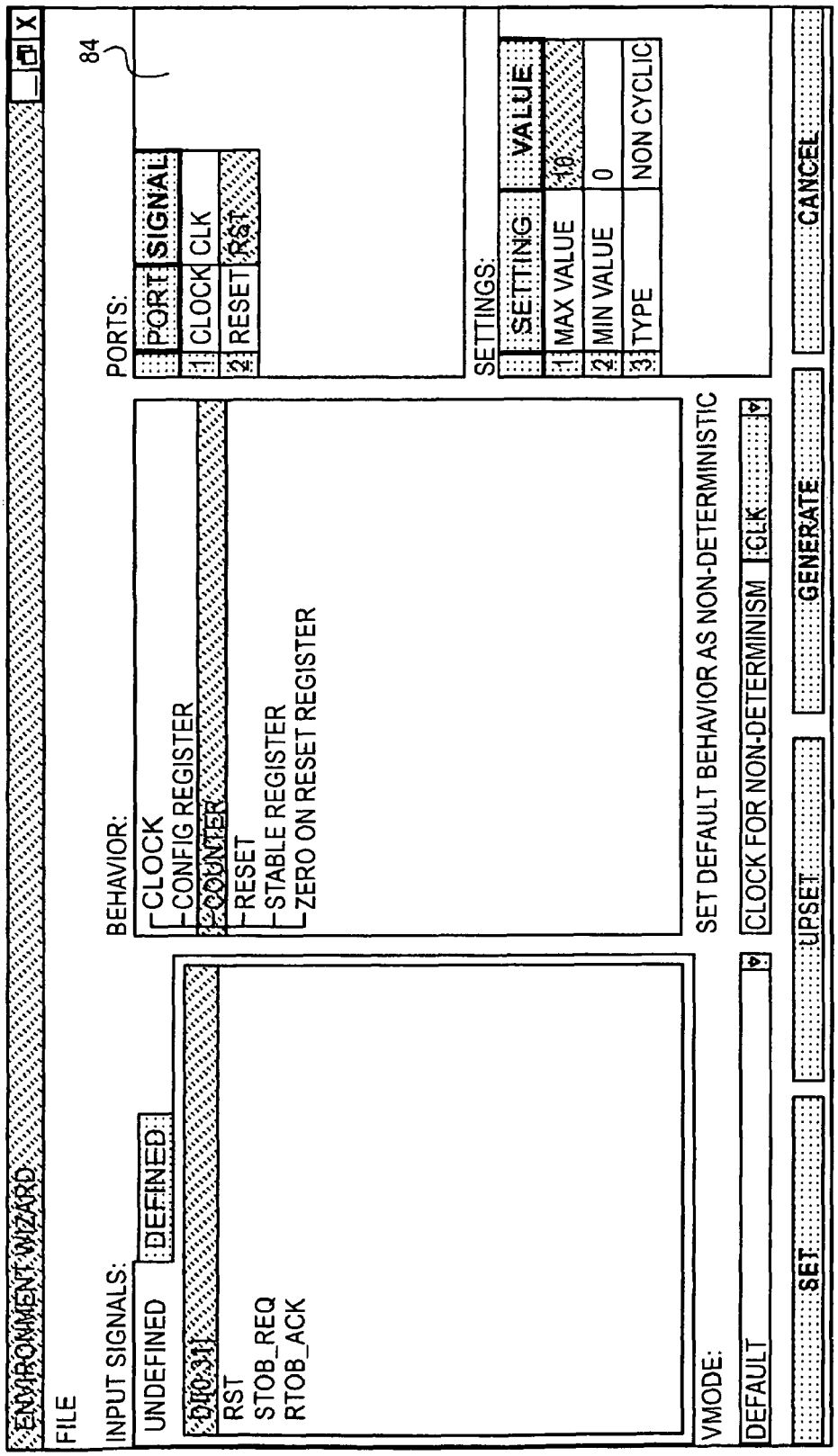
FIG. 6 is another exemplary screen display that is generated by the graphical user interface of FIG. 2, in accordance with a disclosed embodiment of the invention.

Reference is now made to FIG. 6, which is another screen display similar to FIG. 5 that is generated by environment wizard 28, in accordance with a disclosed embodiment of the invention. The display indicates assignment of a behavior to a signal called "DI[0:31]" (which is an array of 32 bits). Its assigned behavior is called "Counter" and the parameters appear on the right side of the display. The left, central and lower right pane in FIG. 6 have the same significance as in FIG. 5. In addition, an upper right pane 84 indicates ports for clock and reset signals.

Listing 1 comprises exemplary environment code relating to the outcome of interactions with the screen displays FIG. 5 and FIG. 6. The code is written a Verilog variant of PSL (Property Specification Language). As noted above, such environment code may alternatively be emitted in other hardware description languages. The code includes two instantiations, vClock_instance_1 and vCounter_instance_2, corresponding to the examples of FIG. 5 and FIG. 6, respectively. These are instances of library cells vClock and vCounter, respectively, and were extracted from libraries 40 (FIG. 2) with the parameters that were chosen by an operator as shown in the foregoing screen displays.

Listing 1

```
'include "env_wiz_lib.v"
vmode default {
    vClock vClock_instance_1 (.clock(CLK),
.IS_ALTERNATING('YES), .INIT_VALUE(1'b0), .PERIOD(1));
    vCounter vCounter_instance_2 ( .clock(CLK),
.counter(DI[0:31]), .reset(RST), .MAX_VAL(10), .MIN_VAL(0),
.IS_CYCLIC('NO));
}
```

Alternate Embodiment 1

From time to time the user may need to override the behavior options of an internal design signal that is available in the graphical user interface or a previously assigned behavior in order to assign a new (usually much simpler) behavior. The graphical user interface 18 may be modified to allow this by enabling the design analyzer to introduce an additional user-defined list of internal design signals and parameters for the design-under-test, for example, by reading an auxiliary configuration file. The graphical user interface may then present the additional list and allow the user to select a user-defined behavior rather than limiting him to one of the standard options.

Alternate Embodiment 2

In this embodiment, the graphical user interface may suggest context-sensitive default parameter values, rather than pre-configured values from a configuration file. For example, when assigning a counter behavior to an input bus, the maximal counter value shown as a default in the graphical user interface may be 15 if the input being assigned applies to a 0bit bus and 255 for an 8-bit bus. In another example when a particular input has been defined by the user as a clock, that input would be suggested as the clock port by the graphical user interface when defining the behavior of other inputs.

Alternate Embodiment 3

Figure 7:
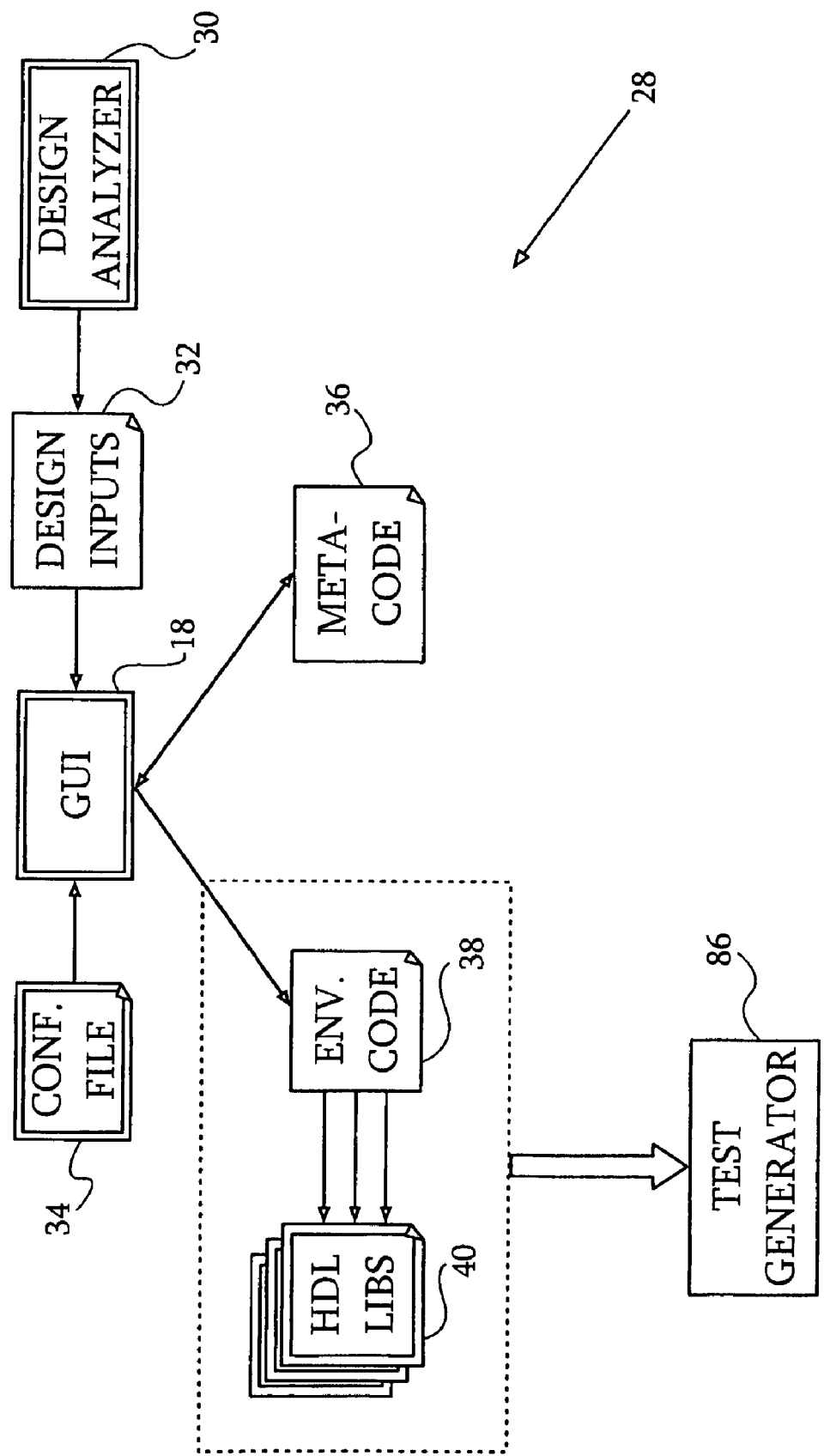
FIG. 7 is a block diagram similar to FIG. 2, in which an output is delivered to a test generator in accordance with a disclosed embodiment of the invention.

In this embodiment, the principles of the invention are applied to verification of a design-under-test using simulation techniques, rather than formal verification. Reference is now made to FIG. 7, which is a block diagram similar to FIG. 2, in which the output of the environment wizard 28 is delivered as one input to a test generator 86 in accordance with a disclosed embodiment of the invention. The ability of the test generator 86 to introduce random unspecified values is generally desirable, since design flaws in practice are usually unpredictable. The test generator 86 generates test suites for the design-under-test, and submits them to an execution engine, e.g., a simulator (not shown), after which the results may be evaluated manually or automatically with a validation engine. Test generation and execution systems suitable for these operations are disclosed, in commonly assigned U.S. Patent Application Publication No. 2006/0218513 and U.S. Pat. No. 7,434,101, which are herein incorporated by reference.

Alternate Embodiment 4

As noted above the principles of the invention deal with synthesizable environments. In this embodiment an integrated circuit is constructed, which implements the behavioral options generated as described in any of the preceding embodiments.

Figure 8:
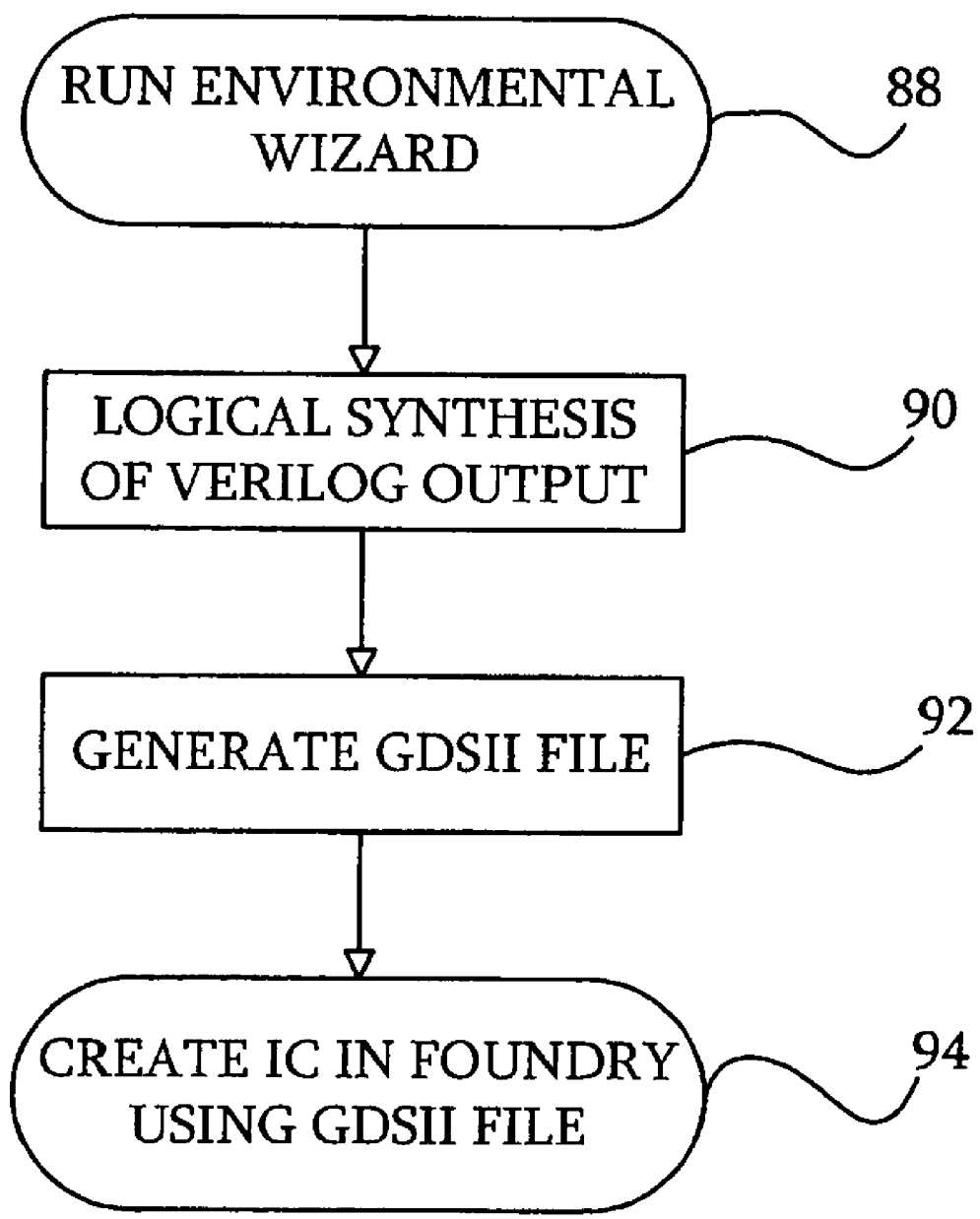
FIG. 8 is a flow chart of a method for constructing a solid state integrated circuit in accordance with a disclosed embodiment of the invention.

Reference is now made to FIG. 8, which is a flow chart of a method for constructing a solid state integrated circuit in accordance with a disclosed embodiment of the invention. At initial step 88 a design-under-test is applied to the environment wizard 28 (FIG. 2), performing the method described with respect to FIG. 4. The environment code output in step 74 (FIG. 4) in this embodiment is Verilog Register Transfer Level (RTL) code that belongs to the synthesizable subset of Verilog.

The Verilog code is processed in step 90, where logic synthesis occurs. Logic synthesis is the process of compiling HDL code to logic gates. A suitable tool for step 90 is the well known Synopsys IC Compiler, in conjunction with Design Compiler® Graphical, available from Synopsys, Inc., 700 East Middlefield Road, Mountain View, Calif. 94043. The IC Compiler compiles RTL code to a netlist, describing the connectivity of the design-under-test. Next, at step 92, the Design Compiler Graphical tool takes the netlist and translates it to the well known GDSII format. This is a binary file format representing planar geometric shapes, text labels, and other information about the layout in hierarchical form.

Next, at final step 94, the GDSII file is submitted to a foundry, which produces a silicon integrated circuit chip based on the GDSII schemas and which operates according to the behavior options accorded the design inputs.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for defining an environment for formal verification, comprising the steps of:
operating a computer system to present a graphical user interface on a display thereof, and executing a design analysis program therein to extract a plurality of design inputs from a specification of a hardware design-under-test;
reading into the computer system respective behavior options for the design inputs from a configuration file;
displaying the design inputs and respective behavior options thereof on the graphical user interface;
establishing a behavioral assignment by designating interactively with the graphical user interface at least a portion of the respective behavior options for application to the design inputs;
responsively to the behavioral assignment, generating environment code that is descriptive of the design inputs and designated respective behavior options thereof; and
applying the environment code in a verification tool for verification of the design-under-test; and
wherein displaying the design inputs and respective behavior options comprises displaying a first list comprising ones of the design inputs upon which the step of establishing a behavioral assignment has not been performed and a second list comprising others of the design inputs for which establishing a behavioral assignment has been performed.

2. The method according to claim 1, wherein the verification tool is a formal verification tool.

3. The method according to claim 1, wherein the verification tool is a test generator coupled to a simulator of the design-under-test.

4. The method according to claim 1, further comprising the steps of:
generating a meta-code file that describes the behavioral assignment; and
in a subsequent performance of the steps of displaying the design inputs and respective behavior options and establishing a behavioral assignment, displaying contents of the meta-code file in the graphical user interface.

5. The method according to claim 1, wherein the step of designating interactively with the graphical user interface is performed by generating an expression builder dialog box display, and constructing a hardware description language expression therein using the at least a portion of the respective behavior options.

6. The method according to claim 1, wherein generating environment code comprises accessing a hardware description language library.

7. The method according to claim 1, further comprising the step of displaying on the graphical user interface a user-defined list of signals and parameters for the design-under-test, wherein designating interactively with the graphical user interface further comprises selecting the signals and parameters.

8. The method according to claim 1, wherein displaying the design inputs and respective behavior options further comprises displaying context-specific default parameter values.

9. A computer software product for defining an environment for formal verification, including a non-transitory computer storage medium in which computer program instructions are stored, which instructions, when executed by a computer, cause the computer to perform the steps of:
operating a computer system to present a graphical user interface on a display thereof, and executing a design analysis program therein to extract a plurality of design inputs from a specification of a design-under-test;
reading into the computer system respective behavior options for the design inputs from a configuration file;
displaying the design inputs and respective behavior options thereof on the graphical user interface;
establishing a behavioral assignment by designating interactively with the graphical user interface at least a portion of the respective behavior options for the design inputs;
responsively to the behavioral assignment, generating environment code that is descriptive of the design inputs and designated respective behavior options thereof; and
applying the environment code in a verification tool for verification of the design-under-test; and
wherein displaying the design inputs and respective behavior options comprises displaying a first list comprising ones of the design inputs upon which the step of establishing a behavioral assignment has not been performed and a second list comprising others of the design inputs for which establishing a behavioral assignment has been performed.

10. The computer software product according to claim 9, wherein the verification tool is a formal verification tool.

11. The computer software product according to claim 9, wherein the verification tool is a test generator coupled to a simulator of the design-under-test.

12. The computer software product according to claim 9, wherein the instructions cause the computer to perform the additional steps of:
generating a meta-code file that describes the behavioral assignment; and
in a subsequent performance of the steps of displaying the design inputs and respective behavior options and establishing a behavioral assignment, displaying contents of the meta-code file in the graphical user interface.

13. The computer software product according to claim 9, wherein the step of designating interactively with the graphical user interface is performed by generating an expression builder dialog box display, and constructing a hardware description language expression therein using the at least a portion of the respective behavior options.

14. The computer software product according to claim 9, wherein generating environment code comprises accessing a hardware description language library.

15. The computer software product according to claim 9, wherein the instructions cause the computer to perform the additional step of displaying on the graphical user interface a user-defined list of signals and parameters for the design-under-test, wherein designating interactively with the graphical user interface further comprises selecting the signals and parameters.

16. The computer software product according to claim 9, wherein displaying the design inputs and respective behavior options further comprises displaying context-specific default parameter values.

17. A data processing system for defining an environment for formal verification, comprising:
a processor;
a display;
a memory accessible to the processor storing programs and data objects therein, the programs including a design analysis program and a module for displaying a graphical user interface, wherein execution of the programs cause the processor to perform the steps of:
presenting the graphical user interface on the display, and executing the design analysis program to extract a plurality of design inputs from a specification of a design-under-test;
reading into the memory respective behavior options for the design inputs from a configuration file;
displaying the design inputs and respective behavior options thereof on the display via the graphical user interface;
establishing a behavioral assignment by designating interactively with the graphical user interface at least a portion of the respective behavior options for the design inputs;
responsively to the behavioral assignment, generating environment code that is descriptive of the design inputs and designated respective behavior options thereof; and
applying the environment code in a formal verification tool for verification of the design-under-test; and
wherein displaying the design inputs and respective behavior options comprises displaying a first list comprising ones of the design inputs upon which the step of establishing a behavioral assignment has not been performed and a second list comprising others of the design inputs for which establishing a behavioral assignment has been performed.

18. The data processing system according to claim 17, wherein the processor is operative to perform the additional steps of:
generating a meta-code file that describes the behavioral assignment; and
in a subsequent performance of the steps of displaying the design inputs and respective behavior options and establishing a behavioral assignment, displaying contents of the meta-code file in the graphical user interface.

19. The data processing system according to claim 17, wherein the step of designating interactively with the graphical user interface is performed by generating an expression builder dialog box display, and constructing a hardware description language expression therein using the at least a portion of the respective behavior options.

20. The data processing system according to claim 17, wherein generating environment code comprises accessing a hardware description language library.

21. The data processing system according to claim 17, wherein the processor is operative to perform the additional step of displaying on the graphical user interface a user-defined list of signals and parameters for the design-under-test, wherein designating interactively with the graphical user interface further comprises selecting the signals and parameters.

22. A method for constructing a solid-state circuit, comprising the steps of:
operating a computer system to present a graphical user interface on a display thereof, and executing a design analysis program therein to extract a plurality of design inputs from a specification of a solid state integrated circuit;

reading into the computer system respective behavior options for the design inputs from a configuration file;

displaying the design inputs and respective behavior options thereof on the graphical user interface;

establishing a behavioral assignment by designating interactively with the graphical user interface at least a portion of the respective behavior options for application to the design inputs;

responsively to the behavioral assignment, generating environment code that is descriptive of the design inputs and designated respective behavior options thereof;

compiling the environment code into a netlist that describes connectivity of the integrated circuit;

translating the netlist into a formatted code that is acceptable to a foundry;

submitting the formatted code to the foundry to produce an integrated circuit chip that is operative according to the behavioral assignment; and wherein displaying the design inputs and respective behavior options comprises displaying a first list comprising ones of the design inputs upon which the step of establishing a behavioral assignment has not been performed and a second list comprising others of the design inputs for which establishing a behavioral assignment has been performed.

\* \* \* \* \*